(12) United States Patent
Brown

(10) Patent No.: US 7,931,990 B2
(45) Date of Patent: Apr. 26, 2011

(54) SOLID OXIDE FUEL CELL HAVING A BUFFER LAYER

(75) Inventor: Nancy E. Brown, New Braintree, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1100 days.

(21) Appl. No.: 11/304,997

(22) Filed: Dec. 15, 2005

(65) Prior Publication Data
US 2007/0141443 A1 Jun. 21, 2007

(51) Int. Cl.
*H01M 8/04* (2006.01)
(52) U.S. Cl. ........ 429/407; 429/443; 429/444; 429/454; 429/456
(58) Field of Classification Search .................. None
See application file for complete search history.

(56) References Cited

U.S. PATENT DOCUMENTS

| | | | |
|---|---|---|---|
| 5,342,703 A * | 8/1994 | Kawasaki et al. | 429/32 |
| 5,356,730 A * | 10/1994 | Minh et al. | 429/32 |
| 5,403,461 A | 4/1995 | Tuller et al. | |
| 5,589,286 A | 12/1996 | Iwata | |
| 5,604,048 A | 2/1997 | Nishihara et al. | |
| 5,922,486 A * | 7/1999 | Chiao | 429/32 |
| 6,692,855 B1 * | 2/2004 | Aizawa et al. | 429/30 |
| 2002/0045083 A1 | 4/2002 | Fleck et al. | |
| 2002/0187394 A1 | 12/2002 | Ovshinsky et al. | |
| 2003/0224238 A1 * | 12/2003 | Finn et al. | 429/35 |
| 2003/0235730 A1 * | 12/2003 | Noetzel et al. | 429/23 |
| 2004/0053109 A1 | 3/2004 | Ovshinsky et al. | |
| 2004/0081875 A1 * | 4/2004 | Milliken et al. | 429/30 |
| 2005/0048356 A1 * | 3/2005 | Ihringer et al. | 429/44 |
| 2006/0188649 A1 * | 8/2006 | Qi et al. | 427/115 |

FOREIGN PATENT DOCUMENTS

| | | |
|---|---|---|
| EP | 0 902 493 A1 | 3/1999 |
| WO | WO 00/30194 A | 5/2000 |
| WO | WO 2004/004030 A | 1/2004 |
| WO | WO 2005/091406 * | 9/2005 |

OTHER PUBLICATIONS

S.P. Jiang et al., "Electrode behaviour at (La, Sr) MnO3/Y2O3-ZrO2 interface by electrochemical impedance spectroscopy," Journal of Power Sources, vol. 110, Issue 1, Jul. 20, 2002, pp. 201-208.

Kjell Wiik, et al.; "Reactions Between Strontium-Substituted Lanthanum Manganite and Yttria-Stabilized Zirconia: I, Powder Samples"; Journal of the American Ceramic Society; vol. 82, No. 3; pp. 721-728; 1999.

Guido Stochniol, et al.; "Chemical Compatibility Between Strontium-Doped Lanthanum Manganite and Yttria-Stablilized Zirconia"; Journal of the American Ceramic Society; vol. 78, No. 4; pp. 929-932; 1995.

(Continued)

*Primary Examiner* — Ula C Ruddock
*Assistant Examiner* — Tony Chuo
(74) *Attorney, Agent, or Firm* — Larson Newman & Abel, LLP; Robert T. Conway

(57) ABSTRACT

The present disclosure is directed to a fuel cell component having a cathode that includes a lanthanum manganate material as well as channels for receiving a flow of oxygen, and a buffer layer extending along the channels through which oxygen flows. The fuel cell component also includes an anode having channels for receiving a flow of fuel and an electrolyte layer disposed between the cathode and the anode.

20 Claims, 2 Drawing Sheets

OTHER PUBLICATIONS

A. Mitterdorfer, et al.; "La2Zr2O7 Formation Between Yttria-Stabilized Zirconia and La0.85Sr0.15MnO3 at 1373 K"; Proc. of the Solid State Chemistry of Inorganic Materials; Pittsburgh, PA; vol. 453; pp. 425-430; 1997.

Nguyen Q. Minh; "Ceramic Fuel Cells"; Journal of the American Ceramic Society; vol. 76, No. 3; pp. 563-588; 1993.

Kjersti Kleveland, et al.; "Reactions Between Strontium-Substituted Lanthanum Manganite and Yttria-Stabilized Zirconia: II, Diffusion Couples"; Journal of the American Ceramic Society; vol. 82, No. 3; pp. 729-734; 1999.

S. P. Jiang; "Issues on Development of (La,Sr) MnO3 Cathode for Solid Oxide Fuel Cells"; Journal of Power Sources; pp. 1-13; 2003.

Tsuyoshi Kawashima, et al.; "Phase Transformation of Yttria-Stabilized Zirconia (3 mol% Y2O3) in Fuel Cell Caused by Manganese Diffusion"; Materials Transactions, JIM; vol. 39, No. 5; pp. 617-620; 1998.

S.P. Jiang, et al.; "Origin of the Initial Polarization Behavior of Sr-Doped LaMnO3 for O2 Reduction in Solid Oxide Fuel Cells"; Solid State Ionics; vol. 138; pp. 183-190; 2001; North-Holland Pub. Co.

Christel Laberty, et al.; "Energetics of Rare Earth Manganese Perovskites A1-xA'xMnO3 (A=La, Nd, Y and A'=Sr, La) Systems"; Journal of Solid State Chemistry; vol. 145; pp. 77-87; 1999; Academic Press.

J.A.M. Van Roosmalen, et al.; "Phases in the Perovskite-Type LaMnO3+8 Solid Solution and the La2O3-Mn2O3 Phase Diagram"; Journal of Solid State Chemistry; vol. 114; pp. 516-523; 1995; Academic Press.

Kiichiro Kamata, et al.; "Nonstoichiometric Behavior and Phase Stability of Rare Earth Manganites at 1200C: (1). LaMnO3"; Materials Research Bulletin; vol. 13; Issue 1; pp. 49-54; Jan. 1978; Pergamon Press.

Tetsuro Nakamura, et al.; "Stability of the Perovskite Phase LaBO3 (B=V, Cr, Mn, Fe, Co, Ni) in Reducing Atmosphere"; Materials Research Bulletin, vol. 14; Issue 5; pp. 649-659; May 1979; Pergamon Press.

Naoki Kamegashira, et al.; "Limiting Oxygen Partial Pressure of LaMnO3 Phase"; Materials Letters; vol. 2; Issue 3; pp. 194-195; Feb. 1984; North-Holland.

O.M. Sreedharan, et al.; "Comment of 'Limiting Oxygen Partial Pressure of LaMnO3 Phase' by Kamegashira et al."; Materials Letters, vol. 2, Issue 6; pp. 547-548; Sep. 1984; North-Holland.

J.H. Kuo; "Oxidation-Reduction Behavior of Undoped and Sr-Doped LaMnO3: Defect Structure, Electrical Conductivity, and Thermoelectric Power"; Journal of Solid State Chemistry; vol. 87; Issue 1; pp. 55-63; Jul. 1990; Academic Press.

J.A.M. Van Roosmalen, et al.; "Phases in the Perovskite-Type LaMnO3+8 Solid Solution and the La2O3-Mn2O3 Phase Diagram"; Journal of Solid State Chemistry; vol. 114; Issue 2; pp. 516-523; Feb. 1995; Academic Press.

J.A.M. Van Roosmalen, et al.; "Chemical Reactivity and Interdiffusion of (La,Sr) MnO3 and (Zr,Y)O2, Solid Oxide Fuel Cell Cathode and Electrolyte Materials"; Solid State Ionics; vol. 52; pp. 303-312; 1992; North-Holland Pub. Co.

Joon Hee Kim, et al.; Mixed Ionic and Electronic Conductivity of [(ZrO2)0.92(Y2O3)0.08] 1-y (MnO1.5)y; Solid State Ionics; vol. 130; Issues 1-2; pp. 157-168; May 2000; North-Holland Pub. Co.

Jurgen Fleig; "Solid Oxide Fuel Cell Cathodes: Polarization Mechanisms and Modeling of the Electrochemical Performance"; Annual Review of Materials Research; vol. 33; pp. 361-382; 2003; Annual Reviews.

A. Mitterdorfer, et al.; "La2Zr2O7 Formation and Oxygen Reduction Kinetics of the La0.85Sr0.15MnyO3, O2(g)|YSZ System"; Solid State Inoics vol. 111; pp. 185-218; 1998.

Harumi Yokokawa, et al.; "Thermodynamic Analysis on Relation Between Nonstoichiometry of LaMnO3 Perovskites and Their Reactivity with ZrO2"; vol. 57; No. 8; pp. 829-836; 1989.

U.S. Appl. No. 11/305,311, filed Dec. 16, 2005, Nancy E. Brown.

U.S. Appl. No. 11/365,464, filed Mar. 1, 2006, Nancy E. Brown.

Heneka, M. J. et al., "Influence of High Current Cycling on the Performance of SOFC Single Cells," Proceedings of The 26th Riso International Symposium on Materials Science, Sep. 2005, pp. 215-222, XP002434341.

Jiang, S. P., "Activation Microstructure, and Polarization of Solid Oxide Fuel Cell Cathodes," Journal of Solid State Electrochemisty Current Research and Development in Science and Technology, Springer-Verlag BE, vol. 11, No. 1, Nov. 29, 2005, pp. 93-102, XP019431444.

Xu, Z. et al., "Effect of Oxygen Storage Materials on the Performance of Proton-Exchange Membrane Fuel Cells," Journal of Power Sources, Elsevier, Amsterdam, NL, vol. 115, No. 1, Mar. 27, 2003, pp. 40-43, XP004414863.

* cited by examiner

# SOLID OXIDE FUEL CELL HAVING A BUFFER LAYER

CROSS-REFERENCE TO RELATED APPLICATION(S)

Background

1. Field of the Disclosure

The present invention generally relates to solid oxide fuel cells (SOFCs).

2. Description of the Related Art

In pursuit of high-efficiency, environmentally friendly energy production, solid oxide fuel cell (SOFC) technologies have emerged as a potential alternative to conventional turbine and combustion engines. SOFCs are generally defined as a type of fuel cell in which the electrolyte is solid metal oxide (desirably non-porous or limited to closed porosity), in which $O^{2-}$ is transported from the cathode to the cathode/electrolyte interface. Fuel cell technologies typically have a higher efficiency and have lower CO and NOx emissions than traditional combustion engines. In addition, fuel cell technologies tend to be quiet and vibration-fee. Solid oxide fuel cells (SOFCs) have an advantage over other fuel cell varieties. For example, SOFCs may use fuel sources such as natural gas, propane, methanol, kerosene, and diesel, among others because SOFCs operate at high enough operating temperatures to allow for internal fuel reformation. However, challenges exist in reducing the cost of SOFC systems to be competitive with combustion engines and other fuel cell technologies. These challenges include lowering the cost of materials, improving degradation or life cycle, and improving operation characteristics such as current and power density.

In the context of long-term operational characteristics of SOFCs, conductivity degradation is a notable parameter that should be addressed to enable formation of commercially viable components. Generally, degradation of has been attributed to a variety of influences, such as changes in the crystalline structure of the solid electrolyte, reaction of the electrolyte with impurities, as well as on-and-off cycling leading to cracks and flaws within the electrolyte layer. Lost conductivity, increases in resistivity, and degradation of contact surface also lead to a reduction in operating voltages and current densities, negatively impacting the performance of the fuel cell, including reduction of the power output. As a result of performance degradation, expensive fuel cell components are replaced more frequently, leading to higher overall energy costs.

As such, many typical fuel cell systems suffer from deficiencies in providing a low cost alternative to other energy sources. In view of the foregoing, it is considered generally desirable to provide improved SOFC designs suitable for use in demanding SOFC applications.

SUMMARY

According to one aspect of the present disclosure, a fuel cell is provided that includes a cathode incorporating a lanthanum manganate material, the cathode having channels for receiving a flow of oxygen and a buffer layer extending along the channels. The fuel cell also includes an anode comprising channels for the flow of fuel therethrough and an electrolyte layer disposed between the cathode and the anode. A buffer layer may be positioned for passage of oxygen therethrough from the channels prior to passage into the lanthanum manganate material, the buffer layer thereby buffering the flow of oxygen into the lanthanum manganate.

According to another aspect of the present disclosure a fuel cell is provided having a cathode including a lanthanum manganate material, the cathode having channels for receiving a flow of oxygen and an anode comprising channels for flow of fuel therethrough. The fuel cell further includes an electrolyte disposed between the cathode and the anode and a buffer layer positioned for passage of oxygen therethrough, prior to passage into the lanthanum manganate material, the buffer layer thereby buffering the flow of oxygen into the lanthanum manganate material.

According to another aspect of the present disclosure a fuel cell system is provided which includes a fuel system for conditioning fuel and an air system providing an oxygen flow path, the air system including a buffer material disposed within the oxygen flow path for providing buffered oxygen. The fuel cell system further includes a solid oxide fuel cell stack connected to the fuel system and connected to the air system, the solid oxide fuel cell stack having a plurality of solid oxide fuel cells, each solid oxide fuel cell of the plurality of solid oxide fuel cells including a cathode having a lanthanum manganate material, the cathode including channels for receiving buffered oxygen, an anode for receiving fuel, as well as an electrolyte layer disposed between the cathode and anode. The fuel cell system also includes a power conditioner electrically coupled to the solid oxide fuel cell stack.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
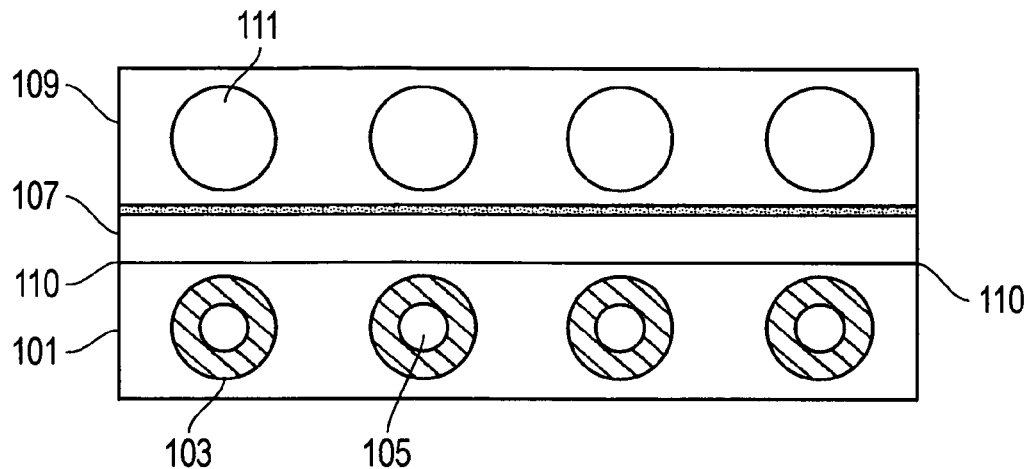
FIG. 1 is a cross-sectional illustration of a SOFC in accordance with an embodiment disclosed herein.

According to one aspect of the present disclosure, a fuel cell is provided that includes a cathode incorporating a lanthanum manganate material, the cathode having channels for receiving a flow of oxygen and a buffer layer extending along the channels. The fuel cell also has an anode including channels for the flow of fuel therethrough and an electrolyte layer disposed between the cathode and the anode. A buffer layer may be positioned for passage of oxygen therethrough from the channels prior to passage into the lanthanum manganate material, the buffer layer thereby buffering the flow of oxygen into the lanthanum manganate.

Referring to the anode of the SOFC, the anode is the electrode that facilitates oxidation of the fuel in the redox reaction that generates a current within the SOFC device. Generally, the anode is referred to as the fuel electrode since it typically transports a fuel gas, such as hydrogen ($H_2$), through the anode material to the anode/electrolyte interface where the oxidation reaction occurs. A high volume of porosity in the anode material aids rapid transport of the fuel gas to the anode/electrolyte interface for oxidation. According to one embodiment, the percent porosity of the anode material is not less than about 10 vol % of the total volume of the anode. According to another embodiment, the percent porosity of the anode is not less than about 15 vol %, such as not less than about 20 vol %, or even not less than about 30 vol %.

Typically, the fuel gas channels are positioned in close proximity to the anode to provide effective transport of the fuel gas from the channels, through the anode material, and ultimately to the anode/electrolyte boundary. In some embodiments the channels are adjacent to the anode, such as a channel structure overlaying the anode material. While in other embodiments, the channels are integrated into the channels and extend into the anode material.

According to one embodiment, the anode comprises a cermet material, that is, a combination of a ceramic and metallic material. For example, the anode may be formed with a nickel and yttria-stabilized zirconia or nickel and gadolinium oxide-stabilized ceria. The nickel is generally produced through the reduction of nickel oxide included in the anode precursor, such as a green ceramic composition that is heat-treated.

Referring to the electrolyte layer, the electrolyte layer is adjacent to the anode, disposed between the anode and cathode. The electrolyte may be formed from materials including zirconia, ceria, gallia, and other known ionic conductors. Oxygen ion conductivity is enhanced with oxide stabilizer materials such as yttrium, scandium, samarium, ytterbium and gadolinium. Stabilizing materials for zirconia include oxides such as $TiO_2$, $CeO_2$, $CaO$, $Y_2O_3$, $MgO$, $Sc_2O_3$, $In_2O_3$, and $SnO_2$. For example, the electrolyte may be formed from yttria-stabilized zirconia, scandia-doped zirconia, ytterbia-doped zirconia, samarium oxide-doped ceria, gadolinium oxide-doped ceria, or calcia-doped ceria, among others. According to a particular embodiment, the electrolyte material is yttria-stabilized zirconia (YSZ).

In one embodiment, the electrolyte material comprises not less than about 8.0 mol % oxide stabilizer in a zirconia matrix, such as not less than about 10 mol % oxide stabilizer, or not less than about 12 mol % of an oxide stabilizer. Still, other embodiments demonstrate a greater degree of oxide stabilizer, such as not less than about 15 mol % within the zirconia. According to the embodiments herein, the amount of oxide stabilizer within the zirconia is altered depending upon the desired phase, crystal structure, and electrical characteristics of the electrolyte material.

The electrolyte is generally a dense structure having a porosity notably less than the porosity of the anode. Moreover, unlike the porosity of the anode, the porosity of the electrolyte layer is generally closed porosity, and generally not a network of interconnected pores, as the porosity of the anode. According to one embodiment, the percent porosity of the electrolyte layer is not greater than about 10 vol %, or not greater than about 5.0 vol %. The percent porosity within the electrolyte layer can be even less, such as not greater than about 2.5 vol %, or still not greater than about 1.0 vol %.

Referring to the cathode, the cathode is positioned adjacent the electrolyte thereby substantially defining a cathode/electrolyte interface that facilitates the reduction of oxygen for the redox reaction within the SOFC. Similar to the anode, the cathode is a porous material for facilitating the flow of gas. Typically, the gas flowing through the cathode includes oxygen, such air or another oxygen-rich source. According to one embodiment, the percent porosity of the cathode is not less than about 10 vol % of the total volume of the cathode. Other embodiments have a greater percent porosity, such as not less than about 15 vol %, not less than about 20 vol %, or still, not less than about 30 vol %.

Materials for the cathode generally include lanthanum manganate materials. Particularly, the cathode can be made of a doped lanthanum manganate material, giving the cathode composition a perovskite type crystal structure. Accordingly, the doped lanthanum manganate material has a general composition represented by the formula, $(La_{1-x}A_x)_yMnO_{3-\delta}$, where the dopant material is designated by "A" and is substituted within the material for lanthanum (La), on the A-sites of the perovskite crystal structure. The dopant material can be selected from alkaline earth metals, lead, or generally divalent cations having an atomic ratio of between about 0.4 and 0.9 Angstroms. As such, according to one embodiment, the dopant material is selected from the group of elements consisting of Mg, Ba, Sr, Ca, Co, Ga, Pb, and Zr . . . . According to a particular embodiment, the dopant is Sr, and the cathode material is a lanthanum strontium manganate material, known generally as LSM.

Referring to the stoichiometry of the doped lanthanum manganate cathode material, according to one embodiment, parameters such as the type of atoms present, the percentage of vacancies within the crystal structure, and the ratio of atoms, particularly the ratio of La/Mn within the cathode material, are provided to manage the formation of conductivity-limiting compositions at the cathode/electrolyte interface during the operation of the fuel cell. The formation of conductivity-limiting compositions reduces the efficiency of the cell and reduces the lifetime of the SOFC. According to one embodiment, the doped lanthanum manganate cathode material comprises $(La_{1-x}A_x)_yMnO_{3-\delta}$, wherein x is not greater than about 0.5, y is not greater than about 1.0, and the ratio of La/Mn is not greater than about 1.0. The value of x within the doped lanthanum manganate composition represents the amount of dopant substituted for La within the structure. According to one embodiment, x is not greater than about 0.5, such as not greater than about 0.4 or 0.3. Still, the amount of dopant provided within the cathode material may be less, such that x is not greater than about 0.2, or still 0.1, and particularly within a range of between about 0.4 and 0.05.

In a particular embodiment, the dopant material is Sr (an LSM cathode), such that the cathode composition is £ $(La_{1-x}Sr_x)_yMnO_{3-\delta}$, where x is not greater than about 0.5, such as not greater than about 0.4, 0.3, 0.2 or even not greater than about 0.1, and particularly within a range of between about 0.3 and 0.05. A cathode having a dopant concentration as described in the previous embodiments is desirable for reducing the formation of conductivity-limiting compositions at the cathode/electrolyte interface during the operation of the fuel cell.

In further reference to the stoichiometry of the cathode, the value of y in the general formula $(La_{1-x}A_x)_yMnO_{3-\delta}$ represents the percent occupancy of atoms on the A-site within the crystal lattice. Thought of another way, the value of y may also be subtracted from 1.0 and represent the percentage of vacancies on the A-site within the crystal lattice. For the purposes of this disclosure, a doped lanthanum manganate material having a value of y less than 1.0 is termed an "A-site deficient" structure, since the A-sites within the crystal structure are not 100% occupied. According to one embodiment, y is not greater than about 0.95, such as not greater than about 0.90, 0.88, or even not greater than about 0.85. In a particular embodiment, the cathode material is LSM (the dopant material is Sr having a composition of $(La_{1-x}Sr_x)_yMnO_{3-\delta}$, and the value of y is not greater than about 1.0, such as not greater than about 0.95, 0.93 or even 0.90, and particularly within a range of between about 0.70 and 0.99. A cathode having an A-site deficient, doped lanthanum manganate composition, as provided in the previously described embodiments, is desirable for reducing the formation of conductivity-limiting compositions at the cathode/electrolyte interface during the operation of the fuel cell.

In further reference to the composition of the doped lanthanum manganate cathode material, according to one embodiment, the ratio of La/Mn is not greater than about 1.0.

The ratio of La/Mn within the cathode material can be modified by the addition of a dopant (the value of x in the general formula) as well as the creation of A-site vacancies (related to the value of y) within the lanthanum manganate crystal structure. As such, in another embodiment, the ratio of La/Mn is less than 1.0, such as less than about 0.97, 0.95, or even less than about 0.93. According to a particular embodiment, the cathode material is LSM having a general composition of $(La_{1-x}Sr_x)_yMnO_{3-\delta}$, wherein x is not greater than about 0.5, y is not greater than about 1.0, and the ratio of La/Mn is not greater than 1.0. Accordingly, the ratio of La/Mn within the LSM cathode material may be less than about 1.0, such as less than about 0.97, 0.95 or even 0.90. Generally, a ratio of La/Mn of not greater than 1.0, and particularly less than 1.0, provides a desirable stoichiometric condition that reduces the formation of conductivity-limiting compositions at the cathode/electrolyte interface during operation of the SOFC. The formation of such conductivity-limiting compositions may reduce the efficiency and the operable lifetime of the SOFC.

The cathode, similar to the anode, is a porous material, which aids the transport of an oxygen-rich gas through the cathode material to the cathode/electrolyte interface to fuel the reduction reaction. Generally the oxygen-rich gas is supplied to the cathode via channels. Typically the channels are positioned within close proximity to the cathode to provide effective transport of the oxygen-rich gas from the channels, through the porous cathode material, and ultimately to the cathode/electrolyte interface. In some embodiments the channels are adjacent to or overlaying the cathode. In other embodiments, the channels are integrated within and extending along the cathode material.

According to one embodiment, the SOFC notably comprises a buffer layer for buffering the flow of oxygen into the lanthanum manganate cathode material. The buffer layer provides a medium for metering the flow of oxygen into the cathode, thereby controlling the partial pressure of oxygen within the cathode. Controlling the partial pressure of oxygen within the cathode allows maintenance of a desirable reducing or oxidizing environment within the cathode during the operation of the fuel cell. Maintaining a desirable partial pressure of oxygen may stabilize the cathode material and attenuate decomposition of the cathode material, which otherwise may result in the formation of undesirable conductivity-limiting compositions at the cathode/electrolyte interface, thereby reducing the efficiency and lifetime of the SOFC.

According to one embodiment, the buffer layer has a negative reduction potential, which during operation of the fuel cell component allows an oxidizing condition within the buffer layer. The oxidizing condition within the buffer layer reduces the partial pressure of oxygen within the cathode such that in comparison to fuel cell cathode without a buffer layer the partial pressure of oxygen within the cathode is reduced. This buffer layer material having may be particularly desirable to buffer the flow of oxygen into the cathode and provide a desirable environment in the cathode during operation. According to one embodiment, the buffer layer conditions the oxygen passing through the buffer layer such that the partial pressure of oxygen within the cathode is not greater than about 1.0 atm. at 1000° C. As such, the partial pressure of oxygen within the cathode may be less, such as not greater than about 0.9 atm, 0.8 atm, or even not greater than about 0.7 atm.

According to one embodiment, the buffer layer comprises a two-phase material. The two phases may include a metal material and a metal oxide material, such as a composition of a transition metal and a ceramic. Alternatively, the two phases may both comprise an oxide. Oxide materials for the buffer layer can include material such as $Ni-NiO$, $Fe_3O_4-Fe_2O_3$, $Mn_3O_4-Mn_2O_3$, $Mn_2O_3-MnO_2$, $Cu-Cu_2O$, and $Mn_3O_4-(La_{1-x}A_x)_yMnO_{3-\delta}$. According to a particular embodiment, the buffer layer can include a two-phase material in which the first phase is a ceramic oxide material that is dissimilar from the material of the cathode and the second phase is the same material as the cathode, such as a lanthanum manganate material. For clarification, a dissimilar ceramic oxide material includes an oxide material that has a different chemical composition than the chemical composition of the cathode material. In one embodiment, the buffer layer comprises a two-phase material having a general composition of $Mn_3O_4-(La_{1-x}A_x)_yMnO_{3-\delta}$. The first phase of this composition is $Mn_3O_4$, a composition dissimilar from the lanthanum manganate cathode composition, while the second phase is $(La_{1-x}A_x)_yMnO_{3-\delta}$ a compound having the same chemical composition as the lanthanum manganate cathode material. It will be appreciated that the chemical composition of the buffer layer material that is similar to the cathode composition can include a selection of desirable compositions as previously described in accordance with the compositions of the cathode.

In continued reference to the buffer layer, the buffer is generally positioned proximate to the flow of the oxygen-rich gas, for passage of the gas therethrough in order to buffer the flow of the gas prior to passage into the cathode. According to one embodiment, the buffer layer extends along the channels of the cathode, such as a buffer layer included in the cathode material. For example, the buffer layer may be integrated within the cathode such that the buffer layer is disposed adjacent to the channels within the cathode as a planar layer. For example, the buffer layer is a planar layer structure disposed between the channels and the bulk of cathode material. However, according to a particular embodiment, the buffer layer extends along the channels, generally surrounding a periphery of the channels. More particularly, the buffer layer may be provided to define the channels, that is, to define an interior surface of the channels through which an oxygen-rich gas flows.

Referring to FIG. 1, a cross-sectional view of a planar SOFC device is illustrated in accordance with embodiments provided herein. FIG. 1 illustrates an SOFC having an anode 109 including anode channels 111 for delivering fuel gas, a cathode 101 and an electrolyte layer 107 disposed between the anode 109 and the cathode 101. The cathode 101 further includes cathode channels 105 for delivering oxygen-rich gas to the cathode 101. The cathode channels 105 include a buffer layer 103 disposed on the interior surface of the cathode channels 105 such that the buffer is positioned within the oxygen flow path. The position of the buffer layer 103 facilitates buffering the flow of oxygen to the cathode 101, thereby inhibiting the formation of conductivity-limiting compositions at the cathode/electrolyte interface 110.

According to another embodiment, a fuel cell stack can be made which incorporates multiple fuel cells. Each fuel cell of the fuel cell stack has a cathode comprising a lanthanum manganate material and channels for receiving a flow of oxygen, as well as a buffer layer extending along the channels, an anode, and an electrolyte layer disposed between the cathode and the anode.

Figure 2:
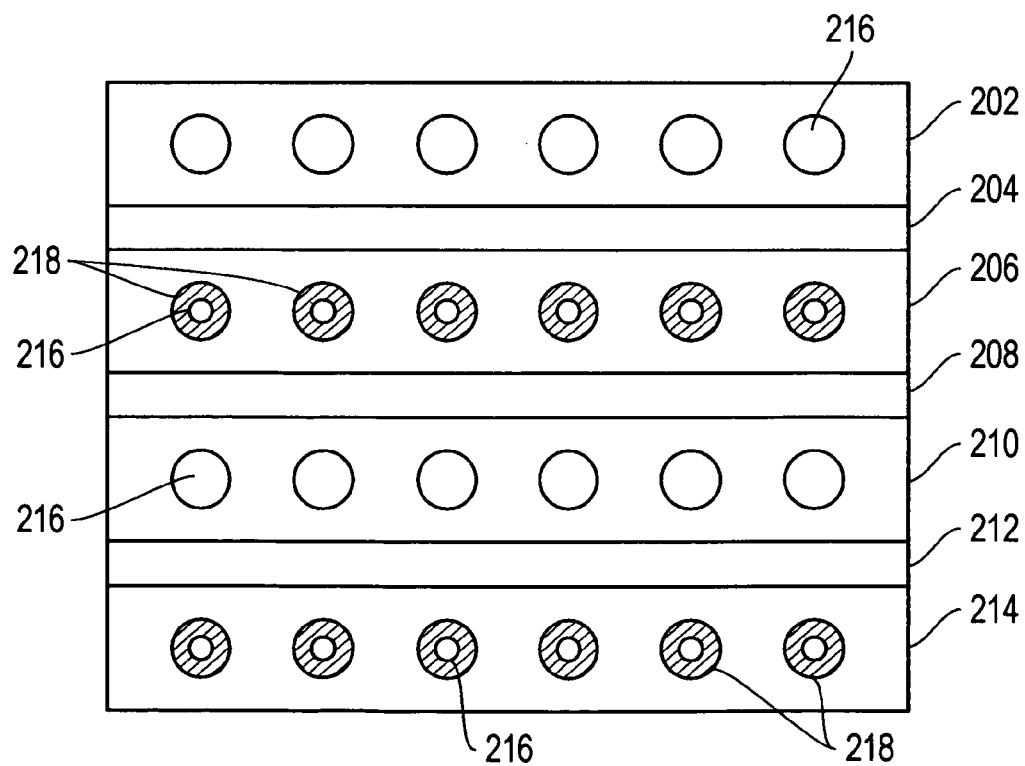
FIG. 2 is a cross-sectional illustration of a SOFC stack in accordance with an embodiment disclosed herein.

FIG. 2 illustrates a fuel cell stack having a plurality of fuel cells in accordance with embodiments provided herein. According to one embodiment, the fuel cells share electrodes, such as the anode and the cathode between individual fuel cells, although other architectures may be used. The stack includes electrode layers 202, 206, 210 and 214 separated by electrolyte layers 204, 208 and 212. As described in accordance with previous embodiments, each electrode layer may include channels 216 for the transport of an oxygen-rich gas or a fuel gas as described previously.

In the particular embodiment illustrated, electrode 202 is an anode and electrode 206 is a cathode with electrolyte layer 204 disposed between the electrodes 202 and 204 to form a single solid oxide fuel cell. It will be appreciated that another single solid oxide fuel cell is defined by electrode 206, which as stated previously is a cathode, electrolyte layer 208 and electrode 210, which is an anode. As illustrated in the exemplary embodiment, each of the individual fuel cells shares an electrode, for example electrode 206 supplies gas to electrolyte layers 204 and 208. Additionally, electrode 210, which according to the illustrated embodiment is an anode, supplies fuel gas to electrolyte layer 208 and 212. The stack may be arranged in a repeating pattern so that several electrodes are shared among adjacent solid oxide fuel cells. Alternatively, non-shared electrode configurations may use gas-impermeable interconnect barriers. The stack may be connected to other stacks in a series, parallel or hybrid series/parallel circuit configuration.

In further reference to the particular embodiment of FIG. 2, a buffer layer 218 is illustrated as extending along channels 216 of electrodes 206 and 214. According to the illustrated embodiment of FIG. 2, the buffer layer defines the channels 216, that is, defines an interior surface of the channels 216 such that the buffer is positioned within the oxygen flow path. The position of the buffer layer 218 facilitates buffering the flow of oxygen to the electrodes 206 and 214.

Figure 3:
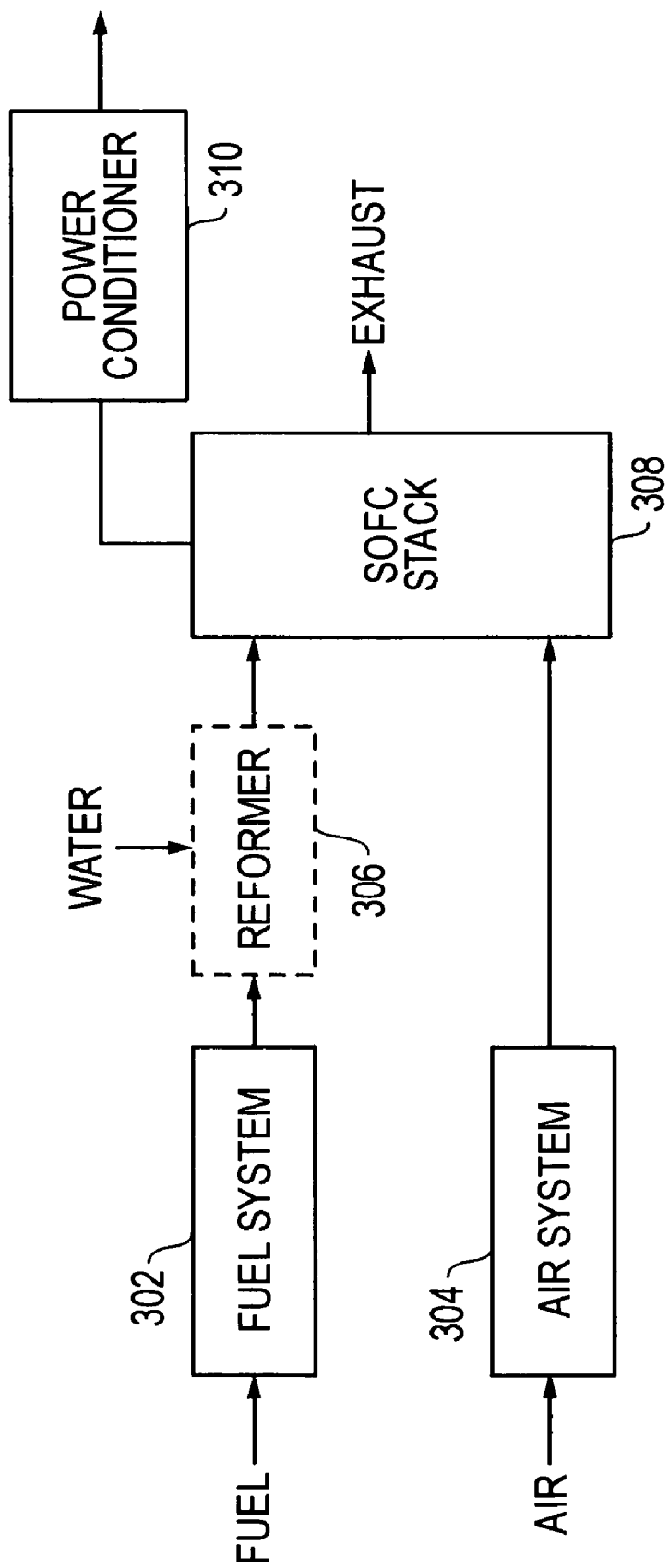
FIG. 3 illustrates an SOFC system in accordance with an embodiment disclosed herein.

The solid oxide fuel cells described above may be incorporated into a SOFC system for producing power. FIG. 3 depicts an exemplary SOFC system. The system includes a fuel system 302, an air system 304, a SOFC stack 308, and a power conditioner 310. The system may also include a reformer 306 depending on the expected operating temperature of the SOFC stack.

Fuel enters the fuel system 302. The fuel system 302 may clean the fuel and/or heat the fuel in preparation for reforming or reaction. The fuel system 302 may include heat exchangers, compressors, pumps, absorption beds, and other components. From the fuel system 302, the fuel enters a reformer 306. The reformer 306 may use the fuel to produce hydrogen and other molecules. The reformer 306 is typically used for low temperature SOFC systems. High temperature SOFC systems may have the advantage of internal reforming and thus utilize unreformed fuel.

In this particular embodiment, the oxygen-rich gas is air which enters the system through the air system 304. The air system 304 may clean, compress, purify, and/or heat the air. The air system may include compressors, absorption beds, membranes, and heat exchangers, among other components.

The fuel and air are directed to the SOFC stack 308. The fuel is typically directed across the anodes of the fuel cells in the SOFC stack and the air is typically directed across the cathodes. In the case of SOFCs, oxygen ion transport across the electrolyte from the cathode to the anode produces an electric potential. This electric potential is conditioned with a power conditioner 310 that is electrically coupled to the SOFC stack 308. The power conditioner 310 may deliver power to a grid or circuitry. Exhaust from the SOFC stack may be used for heat exchange or in the reformation process.

According to embodiments herein, the longevity of an SOFC, SOFC stack, or power system utilizing the SOFC components, may be improved and have stabilized performance. According to particular embodiments, a desirable oxidation and/or reducing environment in the cathode may be maintained to inhibit decomposition of the cathode material, which may result in the formation of conductivity-limiting compositions at the cathode/electrolyte interface. In addition, particular compositional features in the context of various SOFC embodiments may achieve reduction in the decomposition of the cathode and the formation of conductivity-limiting compositions at the cathode/electrolyte interface. For example, A-site deficient lanthanum manganate in the context of SOFC embodiments, may provide a desirable lanthanum deficiency in the cathode material thereby delaying migration of lanthanum to the cathode/electrolyte interface, which is related to decomposition of the cathode material and subsequent formation of conductivity-limiting compositions.

Additionally, according to certain embodiments, combination of an A-site deficient lanthanum manganate cathode with a La/Mn ratio of less than 1.0 aids the formation of a passivation layer at the cathode/electrolyte interface. The passivation layer is a non-conductivity-limiting composition that inhibits the formation of conductivity-limiting compositions at the cathode/electrolyte interface by reducing the migration of other species (e.g., La) to the cathode/electrolyte interface. Additionally, the A-site deficient cathode having a La/Mn ratio less than 1.0 may further be altered to include a dopant material (e.g., Sr). The addition of a dopant material in the context of various SOFC embodiments may further inhibit formation of conductivity-limiting compositions by reducing the thermodynamically-driven migration of certain species to the cathode/electrolyte interface to form conductivity-limiting compositions. According to certain embodiments, the combination of the buffer layer with particular cathode compositions is notable, and functions to reduce the formation of conductivity-limiting compositions by maintaining a desirable partial pressure of oxygen (oxidizing/reducing environment) within the cathode, reducing the thermodynamically-driven migration of certain species to the cathode/electrolyte interface, and forming of a passivation layer at the cathode/electrolyte interface during operation of the SOFC to curtail the formation of conductivity-limiting compositions.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A fuel cell component comprising:
   a cathode comprising a lanthanum manganate material, the cathode having channels for receiving a flow of oxygen, and a buffer layer disposed within the channels as a continuous coating of material having a finite thickness, filling a fraction of the total volume of the channels, and defining an interior surface of the channels through which oxygen flows;
   an anode comprising channels for receiving a flow of fuel; and
   an electrolyte layer disposed between the cathode and the anode;
   wherein the buffer layer comprises a two-phase material; and
   wherein the buffer layer comprises a material selected from the group consisting of $Ni-NiO$, $Fe_3O_4-Fe_2O_3$, $Mn_3O_4-Mn_2O_3$, $Mn_2O_3-MnO_2$, $Cu-Cu_2O$, and $Mn_3O_4-(La_{1-x}A_x)_yMnO_{3-\delta}$, wherein "A" designates a dopant material substituted on the A-site of the perovskite crystal structure, wherein "x" represents the amount of dopant substituted for La within the structure, wherein "y" represents the percent occupancy of atoms on the A-site within the crystal lattice.

2. The fuel cell component of claim 1, wherein the buffer layer comprises a material selected from the group consisting of $Mn_3O_4$—$Mn_2O_3$, $Mn_2O_3$—$MnO_2$, and $Mn_3O_4$—$(La_{1-x}A_x)_yMnO_{3-\delta}$.

3. The fuel cell component of claim 1, wherein the buffer layer comprises a two phase material, a first phase comprising a ceramic oxide material and a second phase comprising a lanthanum manganate material.

4. The fuel cell component of claim 3, wherein the buffer layer comprises a two phase material having a general formula, $Mn_3O_4$—$(La_{1-x}A_x)_yMnO_{3-\delta}$, wherein x is not greater than about 0.3, y is not greater than about 1.0, the ratio of La/Mn is less than about 1.0, and wherein "A" designates a dopant material substituted on the A-site of the perovskite crystal structure.

5. The fuel cell component of claim 1, wherein the buffer layer has a negative reduction potential, and during operation of the fuel cell component, the buffer layer is oxidized such that the conditioned supply of oxygen within the cathode has a reduced partial pressure in comparison to a partial pressure of oxygen in a cathode without a buffer layer.

6. The fuel cell component of claim 5, wherein the buffer layer provides a conditioned supply of oxygen to the cathode, such that the conditioned supply of oxygen within the cathode has a partial pressure value not greater than about 1.0 atm at 1000° C.

7. The fuel cell component of claim 1, wherein the cathode comprises a lanthanum manganate material having a composition of $(La_{1-x}A_x)_yMnO_{3-\delta}$, wherein y is not greater than about 1.0, x is not greater than about 0.5, and the ratio of La/Mn is not greater than about 1.0, wherein "A" designates a dopant material substituted on the A-site of the perovskite crystal structure, wherein "x" represents the amount of dopant substituted for La within the structure, wherein "y" represents the percent occupancy of atoms on the A-site within the crystal lattice.

8. The fuel cell component of claim 7, wherein y is not greater than about 0.95 and the ratio of La/Mn is less than about 1.0.

9. The fuel cell component of claim 1, wherein the cathode comprises a lanthanum manganate material having a composition of $(La_{1-x}A_x)_yMnO_{3-\delta}$, wherein A is a dopant material selected from the group consisting of Mg, Ba, Sr, Ca, Co, Ga, Pb, and Zr, and wherein "A" designates a dopant material substituted on the A-site of the perovskite crystal structure, wherein "x" represents the amount of dopant substituted for La within the structure, wherein "y" represents the percent occupancy of atoms on the A-site within the crystal lattice.

10. The fuel cell component of claim 9, wherein the cathode comprises $(La_{1-x}Sr_x)_yMnO_3$, wherein x is not greater than about 0.5, y is not greater than about 1.0, and the ratio of La/Mn is not greater than about 1.0.

11. The fuel cell component of claim 1, wherein the anode comprises a cermet comprising a metal phase and a ceramic phase.

12. The fuel cell component of claim 1, wherein the electrolyte comprises stabilized zirconia.

13. The fuel cell component of claim 1, wherein the fuel cell component is a component of a fuel cell stack having multiple fuel cells, each fuel cell having a cathode comprising a lanthanum manganate material, the cathode having channels for receiving a flow of oxygen and a buffer layer extending along the channels through which oxygen flows; an anode comprising channels for receiving a flow of fuel; and an electrolyte layer disposed between the cathode and the anode.

14. The fuel cell component of claim 1, wherein the buffer layer comprises a material for buffering the flow of oxygen into the cathode.

15. A fuel cell comprising:
a cathode comprising a lanthanum manganate material, the cathode having channels for receiving a flow of oxygen;
an anode comprising channels for flow of fuel therethrough;
an electrolyte disposed between the cathode and the anode; and
a buffer layer positioned within the interior of the channels as a continuous coating of material having a finite thickness, filling a fraction of the total volume of the channels and defining an interior surface of the channels for passage of oxygen therethrough, prior to passage into the lanthanum manganate material, the buffer layer thereby buffering the flow of oxygen into the lanthanum manganate material;
wherein the buffer layer comprises a material selected from the group consisting of Ni—NiO, $Fe_3O_4$—$Fe_2O_3$, $Mn_3O_4$—$Mn_2O_3$, $Mn_2O_3$—$MnO_2$, Cu—$Cu_2O$, and $Mn_3O_4$—$(La_{1-x}A_x)_yMnO_{3-\delta}$, wherein "A" designates a dopant material substituted on the A-site of the perovskite crystal structure, wherein "x" represents the amount of dopant substituted for La within the structure, wherein "y" represents the percent occupancy of atoms on the A-site within the crystal lattice.

16. The fuel cell of claim 15, wherein the buffer layer extends into and is integrated with the cathode.

17. The fuel cell of claim 16, wherein the buffer layer extends along the channels of the cathode.

18. The fuel cell of claim 15, wherein the buffer layer comprises a two-phase material.

19. The fuel cell of claim 15, wherein the buffer layer has a negative reduction potential and during operation of the fuel cell component, the buffer layer is oxidized such that the conditioned supply of oxygen within the cathode has a reduced partial pressure in comparison to a partial pressure of oxygen in a cathode without a buffer layer.

20. The fuel cell of claim 15, wherein the buffer layer provides a conditioned supply of oxygen to the cathode, such that the conditioned supply of oxygen within the cathode has a partial pressure value not greater than about 1.0 atm at 1000° C.

* * * * *